US012583718B1

(12) United States Patent
Wang et al.

(10) Patent No.: US 12,583,718 B1
(45) Date of Patent: Mar. 24, 2026

(54) CONTROL METHOD FOR AUTOMATED GUIDED FORKLIFT, AND AUTOMATED GUIDED FORKLIFT AND CONTROLLER APPLYING SAME

(71) Applicant: VisionNav Robotics USA Inc., Acworth, GA (US)

(72) Inventors: Jianbin Wang, Acworth, GA (US); You Liu, Acworth, GA (US)

(73) Assignee: VisionNav Robotics USA Inc., Acworth, GA (US)

( * ) Notice: Subject to any disclaimer, the term of this patent is extended or adjusted under 35 U.S.C. 154(b) by 0 days.

(21) Appl. No.: 19/223,846

(22) Filed: May 30, 2025

(51) Int. Cl.
*B66F 9/06* (2006.01)
*B66F 9/075* (2006.01)

(52) U.S. Cl.
CPC ............ *B66F 9/063* (2013.01); *B66F 9/0755* (2013.01)

(58) Field of Classification Search
CPC ............................... B66F 9/063; B66F 9/0755
See application file for complete search history.

(56) References Cited

U.S. PATENT DOCUMENTS

2020/0133265 A1* 4/2020 Modolo .............. B60W 50/035
2021/0316975 A1* 10/2021 Yeo ......................... G01S 17/42
2022/0267131 A1* 8/2022 Magzimof .......... B66F 9/07581
2022/0396459 A1* 12/2022 Kim ...................... B66F 9/0755
2024/0124284 A1* 4/2024 Cantrill ..................... B66F 9/16

FOREIGN PATENT DOCUMENTS

CN 111542487 * 8/2020 ................ B66F 9/16
CN 112325847 * 2/2021 ............... G01C 9/00
CN 115959600 * 4/2023 .............. B66F 17/00
CN 116588863 * 8/2023 .............. B66F 9/075
JP 2017019595 * 1/2017 ................ B66F 9/24
JP 2023109406 A 8/2023

* cited by examiner

*Primary Examiner* — Russell Frejd

(74) *Attorney, Agent, or Firm* — MUNCY, GEISSLER, OLDS & LOWE, P.C.

(57) ABSTRACT

The disclosure relates to a control method for an automated guided forklift, and an automated guided forklift and a controller applying same. The method includes the following steps: determining an angle and a height of the body of the automated guided forklift; determining a height of a fork hole of the carrier; and adjusting an angle and vertical displacement of a fork of the automated guided forklift according to the height of the fork hole and the angle and the height of the body, so as to limit an included angle between the fork and the carrier within a first angle threshold range, and to limit a height difference between prongs of the fork and the fork hole within a first distance threshold range.

20 Claims, 9 Drawing Sheets

CONTROL METHOD FOR AUTOMATED GUIDED FORKLIFT, AND AUTOMATED GUIDED FORKLIFT AND CONTROLLER APPLYING SAME

FIELD OF THE INVENTION

The disclosure relates to a control method for an automated guided forklift, an automated guided forklift and a controller therefor.

BACKGROUND

With rapid development of the logistics industry, automated guided forklifts have been widely applied to increasing aspects of warehouse logistics. In the warehousing environment, goods are stored in complex and diversified layouts, and the automated guided forklifts are required to accurately perform forking and placing operations on the goods.

In some cases, the automated guided forklifts possibly need to forklift and place the goods on an inclined plane (that is, a non-horizontal plane). For example, when an automated guided forklift completely or partially travels on a ramp and needs to fork or place goods from two or three rows at a tail of a container truck, a body of the automated guided forklift is in an inclined state with different heights at front and rear ends, and the goods to be picked and placed in a compartment of the container truck are in a roughly horizontal state. There is an included angle between the automated guided forklift and the goods.

When the goods are further picked and placed by the automated guided forklift, an included angle between the automated guided forklift and the goods to be picked and placed possibly changes.

During slope operation of the automated guided forklift, fork insertion (that is, a fork extends forward in a direction away from a front portion of the forklift so as to be inserted into fork holes of a carrier of the goods) of the fork will cause abnormal lift of the carrier, undesirable movement of the carrier caused by friction between the fork and the carrier, or frequent friction between the fork and a surface of the compartment, and further cause inclining or even falling of the goods. A process of fork withdrawal of the fork (that is, the fork is withdrawn in a direction close to the front portion of the forklift so as to withdraw the fork from the fork holes of the carrier of the goods) is also similar.

Conventional operation of forklifts depends on manual labor. Operators need to adjust positions and angles of forks according to experience, so as to implement operation of the forklifts on an inclined plane. Even in some existing technologies of automated guided forklifts, automatic cooperative control of upward and downward movement and rotation of forks has problems such as insufficient precision, low efficiency, and a poor capability of adapting to complex scenes. For example, when an automated guided forklift operates on an inclined plane, the existing technologies do not provide a complete solution to the following problems: (i) what time an automated guided forklift adjusts a height of a fork to be identical to a height of a fork hole of a carrier to the greatest extent, (ii) whether the fork can rotate up and down and how to rotate the fork to be flush with the fork hole, (iii) whether the automated guided forklift pauses or decelerates to control the fork, and (iv) a suitable speed during operation of the forklift. Algorithms of the existing automated guided forklifts in these operations are not perfect enough, and are likely to cause falling of goods, friction between forks and goods or the ground, forking failure of the forks, or inaccurate placement (for example, displacement) of the forks. All these will influence efficiency and accuracy of entire logistics operation.

BRIEF DESCRIPTION OF THE DRAWINGS

The accompanying drawings provided for further understanding of the disclosure constitute part of the description, and serve to explain the disclosure along with the following specific implementations, instead of limiting the disclosure. In the accompanying drawings.

DETAILED DESCRIPTION

Figure 1A:
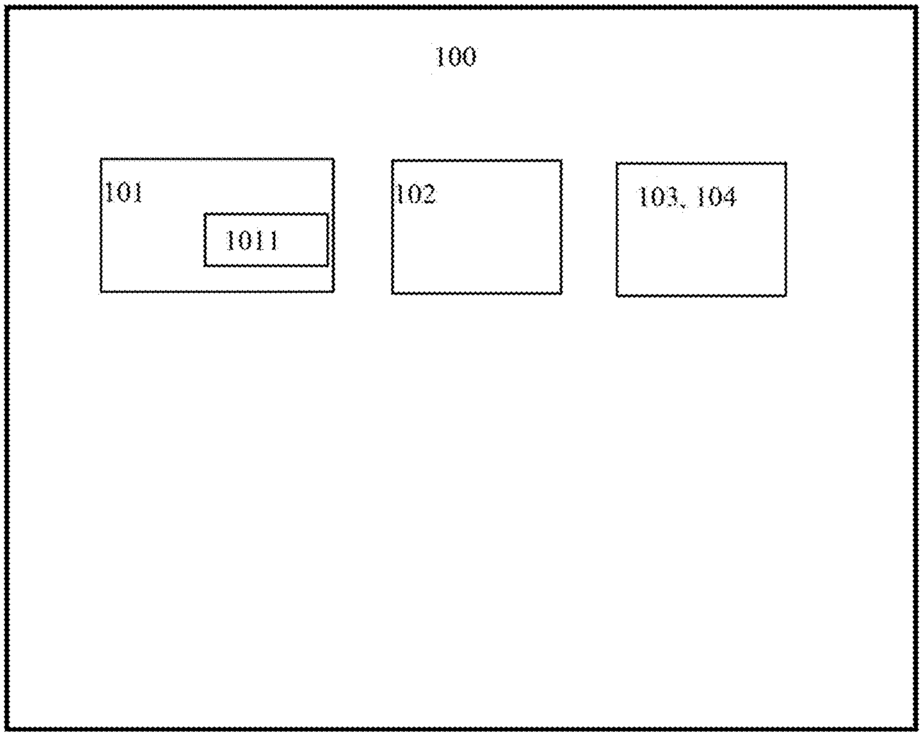
FIG. 1A shows a schematic block diagram of an automated guided forklift according to some embodiments of the disclosure.

Contents disclosed below provide various implementations or examples, which can be used to implement different features of the disclosed contents. Specific examples of components and configurations will be described below to simplify the disclosed content. It may be conceived that the descriptions are merely illustrative, and are not intended to limit the disclosed content. For example, in the following description, a first feature is formed on or above a second feature, which may include some embodiments in which the first feature and the second feature are in direct contact with each other. In addition, in some embodiments, an additional component may be formed between the first feature and the second feature, such that the first feature and the second feature may not be in direct contact with each other. In addition, component symbols and/or numbers may be repeatedly used in a plurality of embodiments of the disclosed contents. The repeated use is based on an objective of brevity and clarity, and does not represent a relation between the different discussed embodiments and/or configurations.

An automated guided forklift, a device widely applied to intelligent logistics and automated warehousing, can implement autonomous transportation, storage and taking of goods without manual driving. The automated guided forklift is generally equipped with a sensor, a navigation system, and a controller, such that efficient and safe operation of the automated guided forklift is ensured. With rapidly increasing requirements of modern logistics, the automated guided forklift has become an important tool for improving operation efficiency and reducing manpower cost.

A method for planning a fork path of an automated guided forklift is a core technology, and relates to efficiency and accuracy of storing and taking goods by the automated guided forklift. Through precise planning of the fork path, a fork of the automated guided forklift may implement path planning, obstacle avoidance and precise storage and taking of the goods, thus ensuring that the automated guided forklift operates efficiently in various complex environments. However, in the prior art, path planning of an automated guided forklift generally focuses on a path planning algorithm of the automated guided forklift running on a horizontal plane, and lacks accurate, efficient, and safe path planning of forks of the automated guided forklift running on an inclined plane (for example, an inclined surface such as a ramp).

In view of that, the disclosure provides a control method for a fork of an automated guided forklift, and an automated guided forklift applying same, so as to solve the problem.

For ease of description, related hardware of the automated guided forklift is defined in the disclosure as follows:

A processor is responsible for executing core functions such as computation, control, and decision. The processor may receive data from a sensor, run a control algorithm, etc., and instruct an executor to complete a task. Common types of the processor may include: a central processing unit (CPU), a digital signal processor (DSP), a micro controller unit (MCU), etc. The processor may denote a processor set used to execute an identical task or different tasks herein.

A memory is configured to store data, a program algorithm, etc. The memory may denote a memory set used to execute an identical task or different tasks herein. Optionally, the processor, a sensor, and a controller in the disclosure may all include respective memories/storage units.

A controller may generally include a processor and a memory at a hardware level. Optionally, the controller may further include parts such as an input/output interface, a mainboard, and a peripheral circuit and element. At a software level, parts such as a control algorithm, an operating system, and a communication protocol may be generally included. The controller may denote a controller set used to execute an identical task or different tasks herein.

With reference to FIG. 1, FIG. 1 shows a schematic block diagram of an automated guided forklift 100 according to some embodiments of the disclosure. In some embodiments, the automated guided forklift 100 may include a controller 101, a fork 102, and sensors 103 and 104. The controller 101 includes a processor 1011. In some embodiments, the controller 101 or the processor 1011 is operatively coupled to the sensors 103 and 104. In some embodiments, the controller 101 or the processor 1011 cooperates with the sensors 103 and 104, so as to implement a method for planning a fork path according to the disclosure. In some embodiments, the controller 101 may be an integrated element. The controller 101 may be composed of one or more control units/processing units. The processor 1011 may include a computation unit or a core computation unit. The processor 1011 may receive data from the sensors 103 and 104 or other hardware devices. The processor 1011 may process data from the sensors 103 and 104 or other hardware devices.

In some embodiments, the sensors 103 and 104 may be integrated elements. The sensors 103 and 104 may be considered to be composed of a plurality of sensor elements. The sensors 103 and 104 include, for example, but are not limited to, laser radar, a visual sensor, an inertial measurement unit, etc.

Figure 1B:
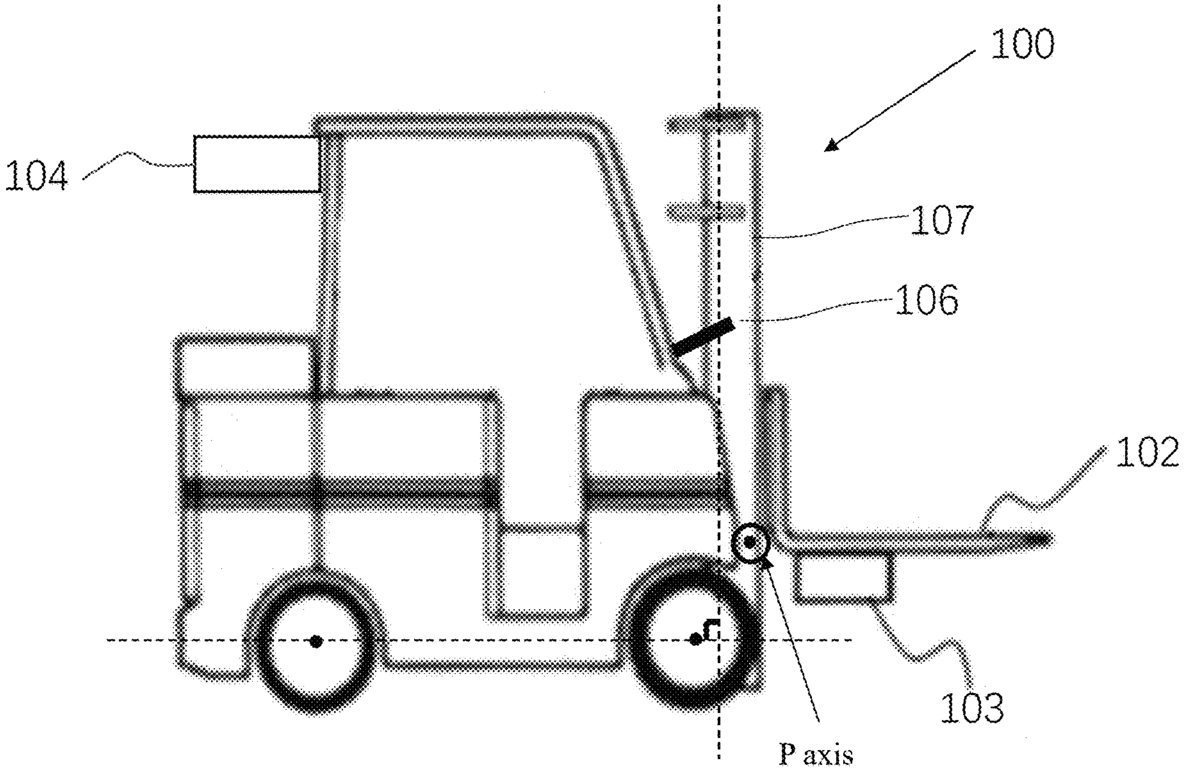
FIG. 1B shows a schematic diagram of an automated guided forklift according to some embodiments of the disclosure.

With reference to FIG. 1B, FIG. 1B shows a schematic diagram of an automated guided forklift 100 according to some embodiments of the disclosure. FIG. 1B only illustratively shows positions, types, and structures of all components of the automated guided forklift 100, and does not constitute a limitation on the disclosure. As long as a roughly identical function is achieved, the disclosure is not limited to be performed completely according to the components shown in FIG. 1B. In addition to the modules shown in FIG. 1A, the automated guided forklift 100 in FIG. 1B further schematically includes a fork gantry 107 that is located in front of the automated guided forklift 100 and extends substantially in a vertical direction. A root of a fork 102 is attached to a front portion of the fork gantry 107 in a slidable manner, such that the fork 102 is lifted up and down. In this way, displacement adjustment (that is, vertical displacement $H^{fork}$ of the fork 102) of the fork 102 in the vertical direction may be implemented. In addition, the fork gantry 107 may be further configured to be a structure including a plurality of sections. Each internal section may be nested in a sliding recess of a frame of a corresponding external section. All the sections of the fork gantry 107 may be enabled to extend upward through a lifting mechanism. The multi-section fork gantry may significantly increase a height of picking and placing goods by the automated guided forklift 100.

As shown in FIG. 1B, the automated guided forklift 100 may further include a driving mechanism 106 that is linked to the fork gantry 107, such that the fork gantry 107 may rotate forward (toward a right side in FIG. 1B) or backward (toward a left side in FIG. 1B) around a P axis. Thus, the fork 102 attached to the fork gantry 107 is driven to rotate upward or downward around the P axis. For example, when the fork gantry 107 rotates forward around the P axis, the fork 102 is driven to rotate downward around the P axis, such that a height of prongs is reduced. On the contrary, when the fork gantry 107 rotates backward around the P axis, the fork 102 is driven to rotate upward around the P axis, such that the height of the prongs is increased. The driving mechanism 106 may be a hydraulic or pneumatic telescopic rod or another telescopic mechanism in the prior art. It is defined that an angle θ of the fork 102 is 0° when the fork gantry 107 is perpendicular to a plane where centers of front and rear wheels of the automated guided forklift 100 are located. A rotation angle θ of the fork 102 around the P axis is a negative value when the fork gantry 107 is moved forward by the driving mechanism 106. The rotation angle θ of the fork 102 around the P axis is a positive value when the fork gantry 107 is moved backward by the driving mechanism 106. A range of the rotation angle θ of the fork 102 around the P axis is limited by hardware of a vehicle (for example, a mounting position and a telescoping length of the driving mechanism 106, and a movable space of the fork gantry 107), or may be an inherent parameter of the automated guided forklift 100 out of a particular application scene.

In some embodiments, a positive angle extremum and a negative angle extremum of rotation of the fork 102 around the P axis are identical. For example, the rotation angle θ of the fork 102 around the P axis roughly ranges from −8° to 8°, −7° to 7°, −6° to 6°, −5° to 5°, −4° to 4°, −3° to 3°, etc.

In some other embodiments, a positive angle extremum and a negative angle extremum of rotation of the fork 102 about the P axis are different and the positive angle extremum is greater than the negative angle extremum. For example, the rotation angle θ of the fork 102 around the P axis roughly ranges from −7° to 8°, −6° to 8°, −6° to 7°, −5° to 8°, −5° to 7°, −5° to 6°, −4° to 8°, −4° to 7°, −4° to 6°, −4° to 5°, −3° to 8°, −3° to 7°, −3° to 6°, −3° to 5°, −3° to 4°, etc.

In some other embodiments, a positive angle extremum and a negative angle extremum of rotation of the fork 102 about the P axis are different and the negative angle extremum is greater than the positive angle extremum. For example, the rotation angle θ of the fork 102 around the P axis roughly ranges from −8° to 7°, −8° to 6°, −8° to 5°, −8° to 4°, −8° to 3°, −7° to 6°, −7° to 5°, −7° to 4°, −7° to 3°, −6° to 5°, −6° to 4°, −6° to 3°, −5° to 4°, −5° to 3°, −4° to 3°, etc.

Figure 2A:
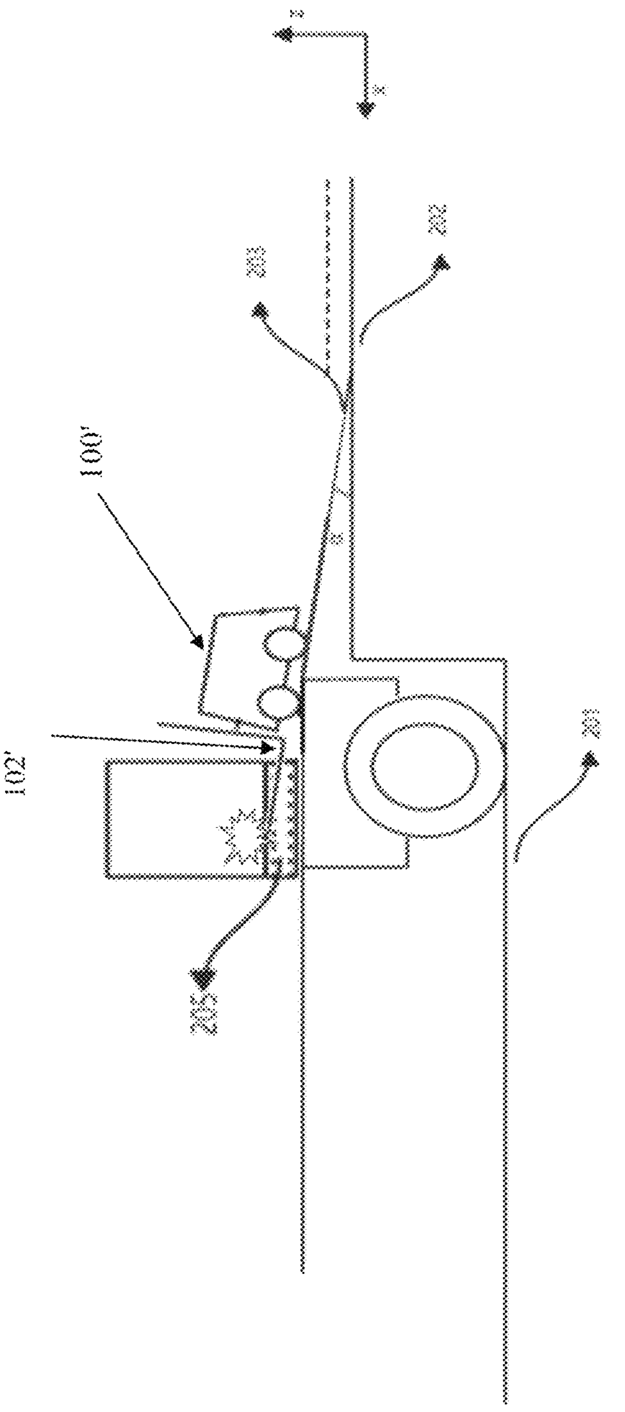
FIG. 2A shows a schematic diagram of slope operation of a manned/automated guided forklift in some embodiments.

With reference to FIG. 2A, FIG. 2A shows a schematic diagram of slope operation of a manned/automated guided forklift 100' in the prior art. When the forklift 100' is the manned forklift, adjustment of a fork 102' completely relies on control of an operator. In this way, the operator needs to have abundant experience, and slowly and precisely operates the forklift 100' and the fork 102', such that goods may be successfully forked.

If the automated guided forklift is used, the prior art has an obvious defect in real-time feedback adjustment of the fork on an inclined plane. When the automated guided forklift 100' attempts to fork two or three rows of goods at a tail of a compartment 206, it may be difficult for the fork 102' to be adjusted to an appropriate height at which the fork is parallel to a fork hole 205 of a carrier in time. In this way, friction may be generated between the fork 102' and the carrier, and the goods may even be inclined or unexpectedly displaced, such that operational danger is increased, and life of the carrier, the ground of the compartment and the fork is shortened.

Particularly, when the carried goods are dangerous goods or goods sensitive to vibration and inclining, an efficient and stable control method for a fork is urgently needed to ensure safety of the forklift during slope operation.

Figure 2B:
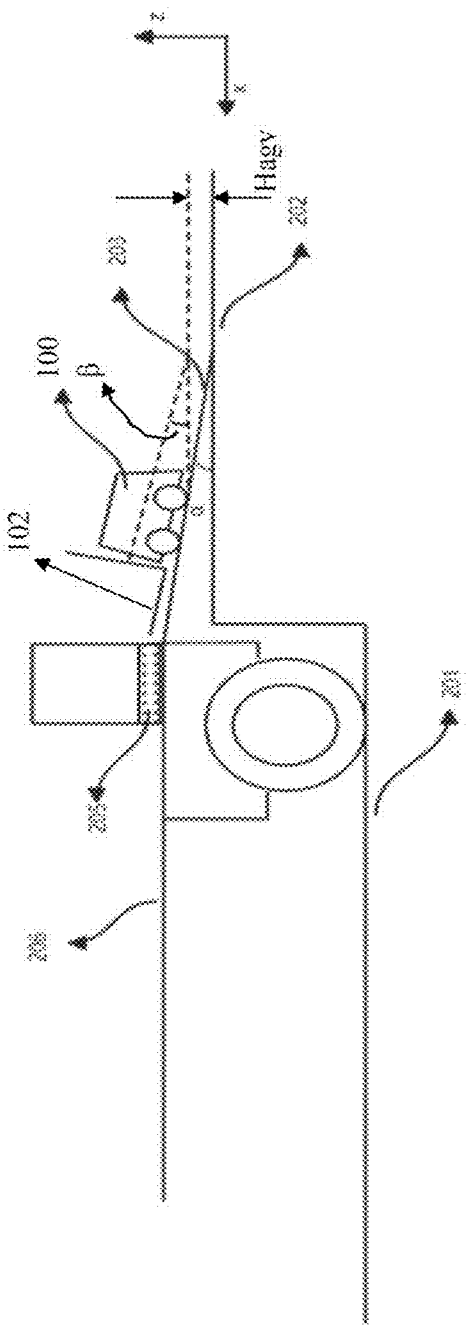
FIG. 2B shows a schematic diagram of slope operation of an automated guided forklift according to some embodiments of the disclosure.

With reference to FIG. 2B, FIG. 2B shows a schematic diagram of an automated guided forklift 100 applied to an inclined plane according to some embodiments of the disclosure. In some embodiments, the automated guided forklift 100 runs and operates on an inclined plane of a ramp 203 shown in FIG. 2B. As shown in FIG. 2B, a container truck is parked at the ground 201 closer to a platform 202, and a tail of a compartment 206 is connected to the platform 202 through the ramp 203. Specifically, the ramp 203 is arranged between the tail of the compartment 206 and the platform 202 in an inclined manner. The automated guided forklift 100 may enter the compartment 206 through the ramp 203. To-be-forked goods are placed in the compartment 206. The goods are placed on a carrier, and the carrier is roughly horizontally placed in the compartment 206. The carrier includes a fork hole 205 extending from one end of the carrier to the other end of the carrier. The goods may be forked and removed from the compartment 206 of the container truck according to an instruction, and the goods are delivered and placed at specified positions for warehousing. Under cooperation of sensors 103 and 104 and a processor 1011, the automated guided forklift 100 accurately plans a path of forking the goods through the fork, such that friction between the fork or the goods and the ground of the compartment or inclining, falling and displacement of the goods are avoided, and operation efficiency is improved. It should be noted that a pattern of the automated guided forklift 100 shown in FIG. 2B is merely for illustrative description, and is not intended to limit the scope of the disclosure.

The sensor 104 on the automated guided forklift obtains an inclination angle β of a body of the forklift relative to the horizontal ground. As shown in FIG. 1B, the inclination angle β is an included angle between a connection line between centers of front and rear directional wheels and the horizontal ground, which is referred to as a body angle β in the following description. Generally, various angle sensors may be used to determine the body angle β of the automated guided forklift 100. In some embodiments, the automated guided forklift 100 is provided with a gyroscope to determine the body angle β. In some other embodiments, the body angle β of the automated guided forklift 100 is determined through three dimensional (3D) laser radar arranged on the automated guided forklift. The 3D laser radar compares a point cloud of objects around the automated guided forklift 100 with a point cloud image of the automated guided forklift 100 on a plane through scanning, and the processor 1011 determines the body angle β of the automated guided forklift 100 according to a comparison result. In some other embodiments, the 3D laser radar may be arranged in a warehouse where the automated guided forklift 100 operates. Point cloud data are obtained through scanning of the automated guided forklift 100, such that a posture of the automated guided forklift is determined, and the body angle β of the automated guided forklift 100 at the moment is computed. In some other embodiments, the body angle β of the automated guided forklift 100 is determined more accurately through cooperative scanning of a plurality of pieces of 3D laser radar arranged in the warehouse. In some other embodiments, the body angle β of the automated guided forklift 100 is determined through cooperation of the 3D laser radar arranged on the automated guided forklift 100 and the 3D laser radar arranged in the warehouse.

The automated guided forklift 100 reaches the compartment 206 of the goods through a ramp 203. Generally, during operation in the warehouse, the automated guided forklift 100 travels on the horizontal plane, and the body angle β of the automated guided forklift is 0. When a front wheel of the automated guided forklift 100 is driven into the ramp 203 and a rear wheel of the automated guided forklift is not driven into the ramp 203, the body angle β of the automated guided forklift 100 is less than an inclination angle of the ramp 203. When the front and rear wheels of the automated guided forklift 100 are located on the ramp 203, the body angle β of the automated guided forklift 100 is equal to the inclination angle of the ramp 203. When the front wheel of the automated guided forklift 100 is driven out of the ramp 203 and the rear wheel of the automated guided forklift is still located on the ramp 203, the body angle β of the automated guided forklift 100 is less than the inclination angle of the ramp 203.

In other embodiments, the automated guided forklift 100 may transport the goods from the warehouse to the compartment of the goods according to an instruction, and accurately unload the goods to specified positions of the compartment. Under cooperation of the sensors 103 and 104 and the processor 1011, the automated guided forklift 100 implements path planning of accurately unloading the goods from the compartment by the fork and withdrawing the fork, such that friction between the fork or the goods and the ground of the compartment or inclining, falling and displacement of the goods are avoided, and operation efficiency is improved.

Figure 3:
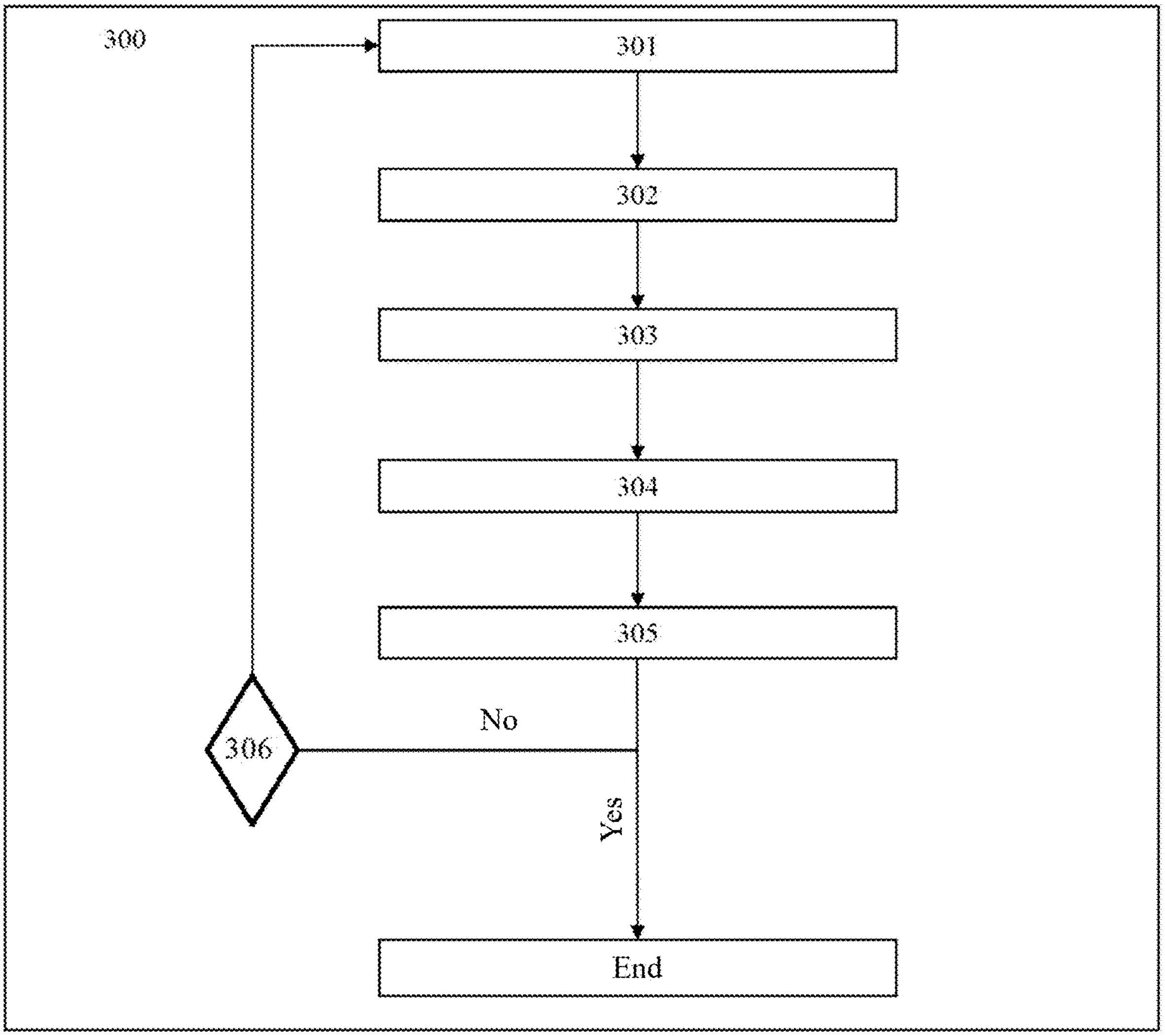
FIG. 3 shows a flowchart of a control method for an automated guided forklift according to some embodiments of the disclosure.

With reference to FIG. 3, FIG. 3 shows a method flowchart of a control method 300 for a fork of an automated guided forklift 100 on an inclined plane according to some embodiments of the disclosure. If a roughly identical result is obtained, the disclosure is not limited to be performed completely according to the steps of the flow shown in FIG. 3. It should be noted that the steps of the flow shown in FIG. 3 are not completely limited to be applied to the automated guided forklift. In other embodiments, steps of the flow shown in FIG. 3 may be applied to any intelligent mobile apparatus. The following embodiments are described with FIG. 1A, FIG. 1B and FIG. 2B as examples. In some embodiments, the steps of the control method 300 for a fork of an automated guided forklift may be performed by different control units/processing units or an identical control unit/processing unit in a controller 101 or a processor 1011.

For example, in some embodiments, in a process of picking and placing a carrier by the automated guided forklift 100, a body of the automated guided forklift 100 is in an inclined state, and the carrier is in a roughly horizontal state. The control method 300 for an automated guided forklift includes:

Step (1): a body angle β and a body height $H_{agv}$ of the automated guided forklift 100 are determined.

Step (2): a height $H_{pallet}$ of a fork hole 205 of the carrier is determined.

Step (3): an angle θ and vertical displacement $H'_{fork}$ of a fork 102 of the automated guided forklift 100 are adjusted according to the height $H_{pallet}$ of the fork hole 205, the body angle β, and the body height $H_{agv}$, so as to limit an included angle between the fork 102 and the carrier within a first angle threshold range, and to limit a height difference between prongs of the fork 102 and the fork hole 205 within a first distance threshold range.

However, the steps (1) to (3) do not strictly constitute a limitation to an execution sequence of one or more of the steps. For example, the control method may perform step (2) and then perform step (1). Or, the processor 1011 may control the automated guided forklift 100 to perform step (1) and step (2) simultaneously.

In some embodiments, the control method further includes the following step:

before step (1) is performed, whether a distance difference between the prongs and the fork hole 205 is within a second distance threshold range is determined, and steps (1) to (3) are performed only when the distance difference between the prongs and the fork hole 205 is within the second distance threshold range.

In other embodiments, as shown in FIG. 3, in the process of picking and placing the carrier by the automated guided forklift 100, a body of the automated guided forklift 100 is in an inclined state, and the carrier is in a roughly horizontal state. The control method 300 for an automated guided forklift includes:

Step 301: a body angle β and a body height $H_{agv}$ of the automated guided forklift 100 are determined.

Step 302: a height $H_{pallet}$ of a fork hole 205 of the carrier is determined.

Step 303: an angle of a fork 102 of the automated guided forklift 100 is adjusted according to the determined body angle β, so as to limit an included angle between the fork 102 and the carrier within a first angle threshold range.

Step 304: a height $H_{fork}$ of prongs of the fork 102 is adjusted according to the height of the fork hole 205 and the determined body angle and height, so as to limit a height difference between the prongs and the fork hole 205 within a first distance threshold range.

Step 305: the automated guided forklift 100 is controlled to move.

Step 306: steps 301 to 305 iterate until an entire process of fork-insertion for goods picking or fork-withdrawal for goods placing is completed.

Similar to the embodiments, the steps 301 to 306 do not strictly constitute a limitation to an execution sequence of one or more of the steps. For example, the control method may perform step 302 and then perform step 301. Or, the processor 1011 may control the automated guided forklift 100 to perform step 301 and step 302 simultaneously.

Step 301

The sensor detects the body angle β of the automated guided forklift 100 in real time. As mentioned above, in some embodiments, the body angle β of the automated guided forklift 100 may be determined through the sensor 103 (for example, the gyroscope or the 3D laser radar) arranged on the automated guided forklift 100. In some other embodiments, the body angle β of the automated guided forklift 100 may be determined through the sensor or a positioning system (for example, one or more pieces of 3D laser radar arranged in the warehouse) arranged outside the automated guided forklift 100.

In some embodiments, a height $H_{agv}$ of a body of the automated guided forklift 100 is a height between a center of a directional wheel (for example, the front wheel) of the automated guided forklift 100 and the warehousing ground. In some embodiments, when the automated guided forklift 100 runs on a horizontal operation plane of the warehouse, the height $H_{agv}$ of the body of the automated guided forklift 100 may be considered as a chassis height. When the automated guided forklift runs on the inclined plane (for example, the ramp 203 shown in FIG. 2A), the height $H_{agv}$ of the body of the automated guided forklift 100 may be determined according to the method described in detail below.

In some embodiments, the height $H_{agv}$ of the body of the automated guided forklift 100 is accurately determined through the sensor 104 arranged on the automated guided forklift 100. The sensor 104 may select 3D laser radar having a 3D simultaneous localization and mapping (SLAM) capability. The 3D laser radar may sense a position and a posture of the automated guided forklift 100 in a warehousing environment in real time and perform 3D modeling on the warehouse. The processor 1011 of the automated guided forklift 100 computes the height $H_{agv}$ of the body of the automated guided forklift 100 according to data transmitted from the sensor 104 through a preset positioning algorithm.

In other embodiments, positioning of a specific plane of the automated guided forklift 100 may be determined through the sensor 103/104 arranged on the automated guided forklift 100. For example, the sensor 103/104 is a two dimensional (2D) laser radar, and may determine a position of an object in a plane scanned by the radar. Compared with the 3D laser radar that may provide position information of a three-dimensional space object, the 2D laser radar may implement only plane positioning, and has a limited function. However, the 2D laser radar has a significant cost advantage, and may effectively control manufacturing cost of an entire automated guided forklift system. As disclosed in the embodiments, the automated guided forklift 100 further determines the body angle β of the automated guided forklift 100 through an additional sensor (for example, the gyroscope). The processor 1011 of the automated guided forklift 100 constantly monitors a position change on the plane at each moment (for example, each 20 milliseconds) fed back by the sensor 103/104. The position change information is mainly embodied as a displacement amount for the automated guided forklift 100 to move forward or move backward in an X direction shown in FIG. 2A. In addition, the controller 101 combines information of the body angle β of the automated guided forklift that is fed back by the gyroscope in real time, and performs integral computation (§ tan B dx) in combination with angle feedback of the gyroscope, so as to compute a change of the height $H_{agv}$ of the body of the automated guided forklift 100. In this case, the height $H_{agv}$ of the body of the automated guided forklift 100 is a relative value rather than an absolute value. That is, the value is not necessarily a height obtained according to an absolute reference standard such as a fixed geodetic base, and is relative height data obtained based on a height change relationship of the automated guided forklift relative to an initial state during operation.

Step 302

Figure 4:
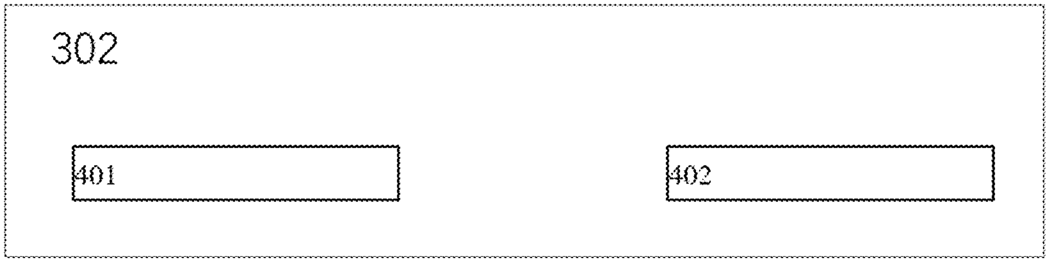
FIG. 4 shows a schematic block diagram of one of steps of a control method for an automated guided forklift according to some embodiments of the disclosure.

With reference to FIG. 4, FIG. 4 shows two cases 401 and 402 of step 302. Step 302: a height $H_{pallet}$ of a carrier placed in a compartment 206 from the warehousing ground is determined through a sensor (for example, a sensor 103, such as 2D laser radar arranged in front of the automated guided forklift 100). If not additionally defined, heights of the carrier and any part/component to which the carrier belongs in the disclosure all refer to heights of the components relative to the warehousing ground. In some embodiments, a height of a fork hole 205 of the carrier is obtained through the sensor, and the height is used as the height $H_{pallet}$ of the carrier. In other embodiments, heights of a top surface and a bottom surface of the carrier are obtained through the sensor. In other embodiments, a positioning mark such as a protrusion or a recess is included on sides (for example, a front side and a rear side) where the fork hole 205 of the carrier is located, and a height of the positioning mark is obtained through the sensor. A processor 1011 invokes preset height difference data between the top surface/bottom surface/positioning mark of the carrier and a center of the fork hole 205 of the carrier to compute a height of the center of the fork hole 205 of the carrier.

The case 401 represents a case where the height $H_{pallet}$ of the carrier is determined by the automated guided forklift 100 in a fork withdrawal process after goods stocking to the compartment 206. After the automated guided forklift 100 forks goods from a warehouse, the automated guided forklift transports the goods to the proximity of a truck that parks at a platform 202. The automated guided forklift 100 reaches an unloading position of the compartment 206 through a ramp 203. Then, the processor 1011 of the automated guided forklift 100 controls a fork 102 to descend slowly. When a pressure sensor arranged on the fork 102 detects that pressure borne by the fork 102 from the goods is 0, it indicates that the carrier is placed into the compartment 206. In this case, the processor 1011 of the automated guided forklift 100 obtains the height $H_{pallet}$ of the carrier detected by the sensor.

The case 402 represents a case where the height $H_{pallet}$ of the carrier is determined by the automated guided forklift 100 in a fork insertion process after goods unloading from the compartment 206. When the automated guided forklift 100 travels to a second distance threshold from the carrier through the ramp 203, a controller of the automated guided forklift 100 controls the sensor to detect the height $H_{pallet}$ of the carrier. Meanwhile, the processor 1011 determines a body height $H_{agv}$ and a body angle β of the automated guided forklift 100 through the sensor according to the above-mentioned method. The sensor of the automated guided forklift 100 detects a distance between the automated guided forklift 100 and the carrier in real time. When the distance is less than or equal to the second distance threshold (for example, 30 cm, 25 cm, 20 cm, 15 cm, 10 cm, 5 cm, etc.), the processor 1011 determines the body height $H_{pallet}$ of the automated guided forklift 100 according to feedback data of the sensor of the automated guided forklift 100, and operation in a subsequent step is performed based on the height.

In the control method for a fork described in detail below, the height of the compartment 206 of a container truck is not changed, regardless of fork exiting for goods placing in the case 401 or fork entering for goods picking in the case 402, the height $H_{pallet}$ of the carrier during operation of the automated guided forklift 100 is basically unchanged (actually, due to influence of a weight of the automated guided forklift 100, when the automated guided forklift is driven into the compartment 206, slight settlement of the height of the compartment is caused. However, the disclosure finds through an experiment that a settlement range of the compartment 206 is within a settlement tolerance range allowable by the design. Based on a warehousing ground coordinate system, the sensor on the automated guided forklift 100 continuously monitors and dynamically calibrates a body posture (height/angle), a height of the fork hole, and a height parameter of prongs. The processor 1011 performs computation and transmits a control instruction according to real-time data of the sensor). To enable the fork 102 of the automated guided forklift 100 to smoothly pick and place goods, a height $H_{fork}$ of the prongs (away from a warehouse horizontal ground) of the fork 102 needs to be as consistent as possible with the height $H_{pallet}$ of the carrier or the fork hole 205. Subsequent steps in the disclosure describes how to achieve the objective, to ensure that the automated guided forklift 100 successfully completes goods picking and placing and ensure that the fork 102 does not excessively rub against the carrier and/or the compartment 206 or encounter other danger in detail.

Step 303

Figure 5:
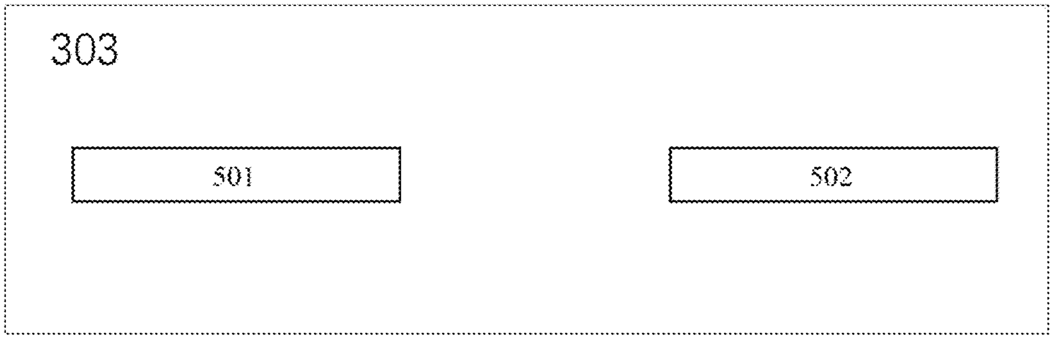
FIG. 5 shows a schematic block diagram of one of steps of a control method for an automated guided forklift according to some embodiments of the disclosure.

With reference to FIG. 5, FIG. 5 shows two cases 501 and 502 where the processor 1011 controls the angle θ of the fork 102 of the automated guided forklift 100 in step 303. When the automated guided forklift 100 operates on an incline plane (for example, the ramp shown in FIG. 2B), and specifically, when the automated guided forklift 100 places goods in the compartment 206 so as to withdraw the fork from the carrier, or a distance between the fork 102 of the automated guided forklift 100 and the goods in the compartment 206 is less than the second distance threshold (with reference to the definition in step 302), the compartment 206 of the container truck is roughly horizontal, so a roughly horizontal posture of the fork 102 needs to be kept as much as possible. Thus, unexpected friction between the fork and the compartment or the carrier of the forklift during fork withdrawal or fork insertion is avoided.

Generally, when the automated guided forklift 100 travels on the horizontal plane of the warehouse, the angle β of the fork is 0 by default. When the automated guided forklift 100 is completely driven into the inclined plane (for example, the ramp) from the horizontal plane, the body angle β is equal to an angle α of the inclined plane (for example, the ramp 203). If the angle θ of the fork 102 is not adjusted by the processor 1011, an included angle between the fork 102 and the horizontal plane is kept as an angle β identical to the body angle β of the automated guided forklift 100. In some embodiments, the gyroscope senses that slope of the inclined plane where the automated guided forklift 100 is located is within an allowable first angle threshold range (for example, an included angle α between the inclined plane and the horizontal plane ≤2°, ≤1.5°, ≤1°, ≤0.5°). In this case, the processor 1011 does not adjust the angle θ of the fork. In this case, the included angle between the fork 102 and the horizontal plane is identical to an included angle between the body of the automated guided forklift and the horizontal plane, which are an inclination angle α of the inclined plane. The fork hole 205 of the carrier in the compartment is roughly horizontal, and accordingly, an included angle between the fork 102 and the fork hole 205 of the carrier in the compartment is α. Further, α is relatively small, so the fork 102 may be inserted into the fork holes 205 so as to complete a goods picking process.

In some other embodiments, the gyroscope senses that the slope of the inclined plane where the forklift is located exceeds the allowable first angle threshold range (for example, the included angle α between the inclined plane and the horizontal plane ≤2°, ≤1.5°, ≤1°, ≤0.5°). In this case, the fork 102 has great inclination relative to the horizontal plane. If the fork 102 in the inclined state is inserted into the fork holes 205 of the carrier placed roughly horizontally in the compartment, excessive friction between the fork 102 and the fork hole 205 or the compartment may be caused. After the processor 1011 receives information indicating that the body angle β of the automated guided forklift 100 is greater than the allowable first angle threshold range, the angle θ of the fork 102 needs to be adjusted, such that the fork 102 is kept in a roughly horizontal posture. Thus, inclining and displacement of the goods on the fork are prevented, unfavorable friction between the goods and the fork is prevented, or unfavorable friction between the fork and the compartment is prevented, such that safe goods picking and placing is facilitated.

In some embodiments, the case 501 is that the angle θ of the fork 102 should be adjusted to be equal to a negative value of the body angle β of the automated guided forklift 100 in an ideal state, that is, θ=−β. In this case, the body angle of the automated guided forklift is β, and a value of a downward rotation angle θ of the fork 102 is −β. In this way, it is ensured that the fork 102 is in a roughly horizontal posture.

In some embodiments, the case 502 is that an adjustable range of the rotation angle θ of the fork 102 is smaller than the body angle β of the automated guided forklift 100 under limitation of hardware of the automated guided forklift 100. For example, an adjustment range of the rotation angle θ of the fork 102 of the automated guided forklift 100 is [−6°, 6°], and an inclination angle of the ramp is 8°. Imagine that the automated guided forklift 100 is completely driven into the ramp 202 (that is, all wheels of the automated guided forklift 100 are located on the ramp). In this case, even if the angle of the fork 102 is adjusted to a lower limit value of-6°, it is not ensured that the fork 102 is completely horizontal, and the fork still has an included angle of 2° relative to the horizontal plane. The body angle β of the automated guided forklift 100 is greater than a limit value of the angle θ to which the fork 102 may be adjusted down, so an inclination trend of the fork 102 is to enable a tip of the fork to be higher than a root of the fork. Thus, the goods carried on the fork 102 tend to incline toward the root of the fork 102, and then are blocked by a vertical part (for example, the fork gantry 107) of the root of the fork. This case is self-stable, and may prevent the goods on the fork 102 from accidentally sliding off the tip of the fork 102. However, the included angle between the fork 102 and the horizontal plane still needs to be controlled within a proper range, such that pressing and damage caused by excessive inclination of the goods on the carrier are prevented.

In the above-mentioned embodiments, a range of the angle θ to which the fork 102 may be adjusted is less than the body angle β of the automated guided forklift 100, and the processor 1011 adjusts the rotation angle θ of the fork 102 to the lower limit value to complete fork withdrawal and insertion operation of the fork 102. Although the fork 102 is not completely horizontal, the fork presents a roughly horizontal state, that is, the included angle between the fork 102 and the horizontal plane or the carrier in a horizontal posture is within the allowable first angle threshold range (for example, ≤2°, ≤1.5°, ≤1°, ≤0.5°), such that the objective of picking and placing goods on the included plane in the disclosure may be achieved.

Step 304

Figure 6:
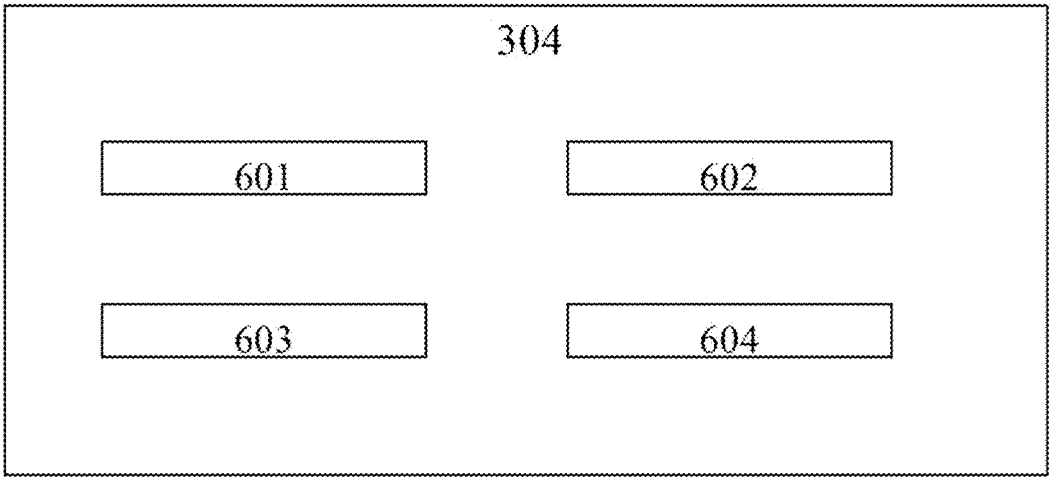
FIG. 6 shows a schematic block diagram of one of steps of a control method for an automated guided forklift according to some embodiments of the disclosure.

With reference to FIG. 6, FIG. 6 shows a step that the processor 1011 adjusts the height $H_{fork}$ of the prongs of the fork 102 of the automated guided forklift 100 in step 304, which includes two cases 601 and 602.

To ensure that the fork 102 may pick and place the goods at a suitable height, the height $H_{fork}$ of the prongs of the fork 102 should be located within a height range of the fork hole 205 of the carrier. Preferably, the height $H_{fork}$ of the prongs of the fork 102 is equal to the height of the center of the fork hole 205.

In some embodiments, the height $H_{fork}$ of the prongs of the fork 102 refers to a height of the prongs of the fork 102. The prongs of the fork 102 need to be completely aligned with the fork holes 205 of the carrier. Otherwise, the fork cannot be inserted. The height $H_{fork}$ of the prongs of the fork 102 is influenced by a plurality of parameters 601, 602, 603, and 604.

Parameter 601: The Body Height $H_{agv}$

The fork 102 moves with movement of the automated guided forklift 100. When the automated guided forklift 100 travels completely or partially on the inclined plane, the body height $H_{agv}$ of the automated guided forklift 100 changes with the movement of the automated guided forklift, and the height $H_{fork}$ of the prongs of the fork 102 also changes. Thus, the body height $H_{agv}$ of the automated guided forklift 100 is one of the parameters influencing the height $H_{fork}$ of the prongs of the fork 102.

Parameter 602: The Body Angle β

The body angle β of the automated guided forklift 100 may influence the body height $H_{agv}$ of the automated guided forklift 100, and further influence the height $H_{fork}$ of the prongs of the fork 102. If a distance between the prongs of the fork 102 of the automated guided forklift 100 and the body (for example, a directional wheel center) of the automated guided forklift 100 is defined as L1, a variation component of the height $H_{fork}$ of the prongs of the fork 102 caused by the body angle β of the automated guided forklift 100 is L1*sin(β). That is, a change value of the height $H_{fork}$ of the prongs caused by the body angle β is determined by the distance L1 between the prongs and the body and the body angle β.

Parameter 603: The Rotation Angle θ of the Fork 102

The fork 102 may rotate around the P axis, and the rotation angle θ may influence the height $H_{fork}$ of the prongs of the fork 102. If a (horizontal) length of the fork 102 of the automated guided forklift 100 is defined as L2, a variation component of the height $H_{fork}$ of the prongs of the fork 102 caused by the rotation angle θ of the fork 102 is L2*sin(θ). That is, a change value of the height of the prongs caused by the angle θ of the fork 102 is determined by the length L2 of the fork 102 and the angle θ of the fork 102.

Parameter 604: The Vertical Displacement $H'_{fork}$ of the Fork 102

The fork 102 may move vertically along the fork gantry 107. The processor 1011 is configured to determine the vertical displacement $H'_{fork}$ of the fork 102 along the fork gantry 107.

In conclusion, the height of the prongs is equal to the sum of the height of the body, the vertical displacement of the fork 102, a height change value caused by the angle of the body, and a height change value caused by the angle of the fork 102. Specifically, the height $H_{fork}$ of the prongs of the fork 102 is determined by an arithmetic sum of the four parameters 601, 602, 603 and 604, that is, $H_{fork}=H_{agv}+L1*\sin(\beta)+L2*\sin(\theta)+H'_{fork}$. The processor 1011 adjusts one or more of the parameters, such that the height $H_{fork}$ of the prongs of the fork 102 of the automated guided forklift 100 is consistent with the height $H_{pallet}$ of the fork hole 205 of the carrier. In some embodiments, the sensor feeds back the height $H_{fork}$ of the prongs and the height $H_{pallet}$ of the fork hole 205 of the carrier. The processor 1011 determines whether a difference between the height $H_{fork}$ of the prongs and the height $H_{pallet}$ of the fork hole 205 of the carrier is within the allowable first distance threshold range (for example, ≤0.5 cm, ≤1 cm, ≤1.5 cm, ≤2 cm, ≤2.5 cm, ≤3 cm, ≤3.5 cm, ≤4 cm, ≤4.5 cm, ≤5 cm, ≤6 cm, ≤7 cm, etc.). If yes, a precision requirement for goods picking and placing of the fork is satisfied, the objective of the disclosure may be achieved, and it is not necessary to adjust the height $H_{fork}$ of the prongs and the height $H_{pallet}$ of the fork hole 205 of the carrier to be completely identical. If no, the height $H_{fork}$ of the prongs is adjusted according to a control flow of the disclosure, such that the difference between the height $H_{fork}$ of the prongs and the height $H_{pallet}$ of the fork hole 205 is within the allowable first distance threshold range.

The height $H_{fork}$ of the prongs of the fork 102 is determined by the four parameters. However, the parameters 601 and 602 are influenced by the slope of the inclined plane and a traveling direction of the automated guided forklift 100, and cannot be actively adjusted by the processor 1011. In order to implement automatic goods picking and placing on the inclined plane of the disclosure, the parameter 603 and/or the parameter 604 are mainly adjusted.

In some embodiments, if the body angle β is within the first angle threshold range or the angle θ of the fork 102 reaches a limit value, only the vertical displacement $H'_{fork}$ of the fork 102 is adjusted, and the angle θ of the fork 102 is not adjusted, such that the height difference between the prongs and the fork hole 205 is limited within the first distance threshold range. To achieve this objective, the processor 1011 adjusts the height $H_{fork}$ of the prongs of the fork 102 and the height of the fork hole 205 of the carrier to be identical by sliding the fork 102 vertically along the fork gantry 107 (for example, the heights are identical or a height difference is within the first distance threshold range), and the included angle between the fork 102 and the carrier is limited within the first angle threshold range.

In some embodiments, the processor 1011 adjusts the height $H_{fork}$ of the prongs of the fork 102 and the height of the fork hole 205 of the carrier to be identical by adjusting the rotation angle θ of the fork 102.

In some embodiments, if a difference between the angle θ of the fork 102 and a negative value of the body angle β is not within the first angle threshold range and the angle θ of the fork 102 does not reach a limit value, the vertical displacement $H'_{fork}$ of the fork 102 and the angle θ of the fork 102 are adjusted simultaneously, so as to limit the height difference between the prongs and the fork hole 205 within the first distance threshold range.

In some embodiments, the processor 1011 adjusts the rotation angle θ of the fork 102, and then adjusts the vertical displacement $H'_{fork}$ of the fork 102 along the fork gantry 107, such that the height $H_{fork}$ of the prongs of the fork 102 and the height of the fork hole 205 of the carrier are enabled to be identical (for example, the heights are identical or the height difference is within the first distance threshold range), and the included angle between the fork 102 and the carrier is limited within the first angle threshold range.

In some other embodiments, the processor 1011 adjusts the vertical displacement $H'_{fork}$ of the fork 102 along the fork gantry 107, and then adjusts the rotation angle θ of the fork 102, such that the height $H_{fork}$ of the prongs of the fork 102 and the height of the fork hole 205 of the carrier are enabled to be identical (for example, the heights are identical or the height difference is within the first distance threshold range), and the included angle between the fork 102 and the carrier is limited within the first angle threshold range.

Then, the processor 1011 controls the automated guided forklift 100 to perform step 305 to keep the automated guided forklift 100 to move in a target direction. For example, when the automated guided forklift 100 enables the fork to enter to pick the goods, the processor 1011 controls the automated guided forklift 100 to move toward the compartment 206 of the container truck, that is, to move uphill (move forward) along an inclined plane of the ramp. When the automated guided forklift 100 withdraws the fork to place the goods, the processor 1011 controls the automated guided forklift to move away from the compartment 206 of the container truck, that is, to move downhill (move backward) along the inclined plane of the ramp.

In some embodiments, as the automated guided forklift 100 moves, the body height $H_{agv}$ and the body angle β of the automated guided forklift may change accordingly. The processor 1011 computes the current body height $H_{agv}$ and the body angle β of the automated guided forklift 100 according to data fed back by the sensor through invoking of a preset algorithm for example. According to the body angle β, an instruction is transmitted to adjust the rotation angle θ of the fork of the automated guided forklift 100, such that the rotation angle θ of the fork 102 is equal to the negative value of the body angle β of the automated guided forklift 100, or θ is adjusted to the limit value closest to the negative value of the body angle β of the automated guided forklift 100.

In some embodiments, the processor 1011 uses the height $H_{pallet}$ as a target height of the prongs of the fork 102 according to the height $H_{pallet}$ of the carrier carrying the goods obtained by the sensor, inversely computes the vertical displacement $H'_{fork}$ of the to-be-adjusted fork 102 along the fork gantry 107 through the algorithm in step 304, and controls the fork 102 to move by the vertical displacement $H'_{fork}$ along the fork gantry 107.

Step 305

Figure 7:
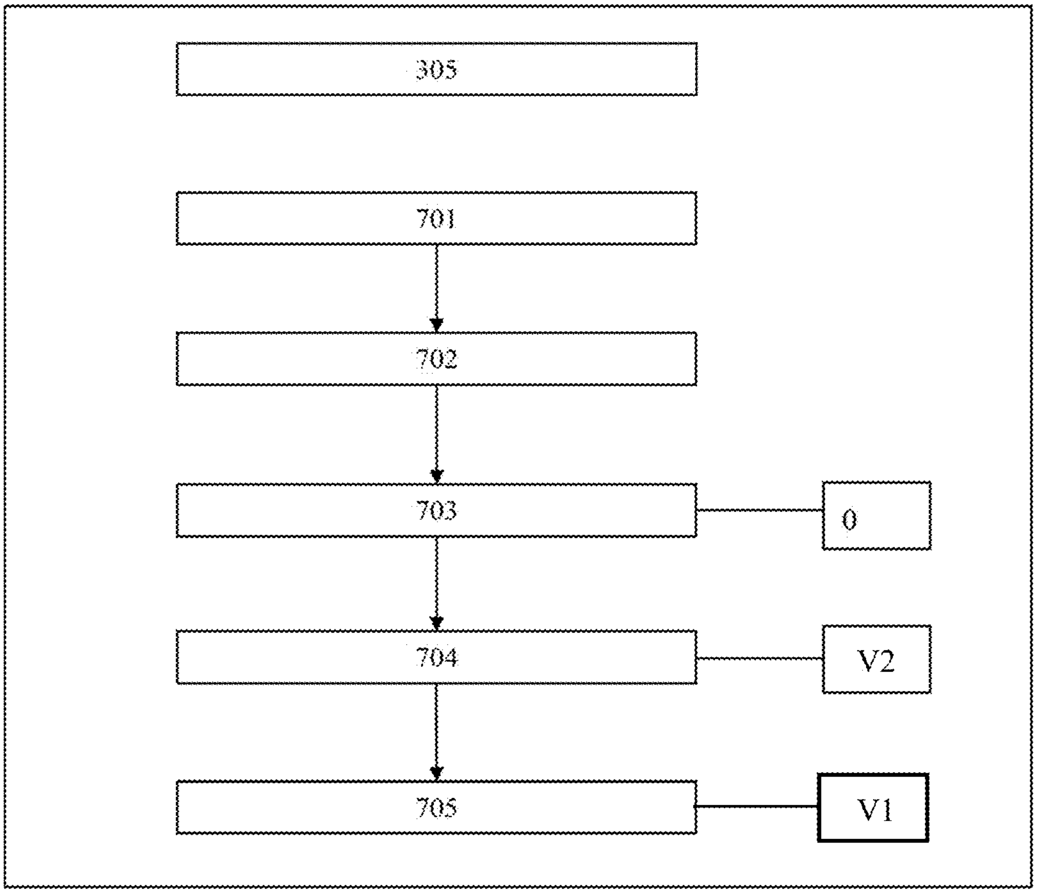
FIG. 7 shows a flowchart of a control method for an automated guided forklift according to some embodiments of the disclosure.

With reference to FIG. 7, FIG. 7 shows a flowchart of controlling the automated guided forklift 100 to move by the processor 1011 in step 305. The flowchart includes the following steps:

Step 701: the processor 1011 adjusts a speed of the automated guided forklift 100 to be not greater than a first speed.

Step 702: the processor 1011 determines first time for adjusting the angle θ of the fork 102 and second time for adjusting the vertical displacement $H'_{fork}$ of the fork 102 along a fork gantry 107.

Step 703: the processor 1011 determines whether adjustment time determined in step 702 is less than third time, and accordingly adjusts the speed of the automated guided forklift 100.

Step 704: the processor 1011 determines whether adjustment time determined in step 703 is less than fourth time, and accordingly adjusts the speed of the automated guided forklift 100.

Step 705: the processor 1011 determines that the adjustment time determined in step 703 is less than the fourth time, and keeping the speed of the automated guided forklift 100 to be not greater than the first speed.

Step 701

In some embodiments, the automated guided forklift 100 travels on the inclined plane of the ramp to pick goods from the compartment 206 of the container truck. When the automated guided forklift 100 is far away (for example, 1 m or above, 0.5 m or above, etc.) from the compartment or to-be-forked goods, a traveling speed of the automated guided forklift 100 is relatively high to improve efficiency, and for example, 0.5 m/s, 0.8 m/s, 1 m/s, etc. As the automated guided forklift 100 moves, the automated guided forklift gradually approaches the to-be-forked carrier. When the sensor 103 detects that a distance difference between the prongs and the fork hole 205 is within the second distance threshold range, a speed of the automated guided forklift 100 is adjusted to be not greater than the first speed V1. Specifically, when the sensor detects that the automated guided forklift 100 has a relatively small second distance threshold (with reference to the definition in step 302) from the to-be-forked carrier, for the purpose of safety, considering that time needs to be taken by the processor 1011 to adjust all the parameters, the processor 1011 suitably reduces the speed of the automated guided forklift 100 to be not greater than the first speed V1. For example, the speed is reduced to 0.35 m/s, 0.3 m/s, 0.25 m/s, 0.2 m/s, etc., and preferably reduced to 0.25 m/s.

In some embodiments, the automated guided forklift 100 travels on the inclined plane of the ramp and uploads the goods to a preset position of the compartment 206. In this case, the fork 102 needs to exit the fork holes 205 of the carrier. In the process, the automated guided forklift 100 is backed. Similar to the case of goods picking in the embodiment, during fork withdrawal for goods placing, the speed of the automated guided forklift 100 also needs to be suitably reduced to be not greater than the first speed V1. For example, the speed is reduced to 0.35 m/s, 0.3 m/s, 0.25 m/s, 0.2 m/s, etc. Preferably, the speed is reduced to 0.25 m/s, so as to ensure a safe and accurate fork withdrawal process.

In some embodiments, when the automated guided forklift 100 moves backward and the sensor 103 detects that the distance difference between the prongs and the fork hole 205 is not within the second distance threshold range, the vertical displacement of the fork 102 is kept to reach a predetermined value. Specifically, When the controller determines that the fork withdrawal operation is completed and the sensor detects that the distance between the fork 102 and the carrier is greater than the second distance threshold (with reference to the definition in step 302), the processor 1011 controls the fork 102 to rise by the vertical displacement $H'_{fork}$ of the predetermined value along the fork gantry 107. For example, the fork rises by 5 cm, 10 cm, 15 cm, 20 cm, etc., so as to provide a safe height. Thus, friction between the fork 102 and the inclined plane of the compartment 206 or the ramp is avoided. In this case, the fork withdrawal operation is completed, and the angle θ of the fork and the displacement of the fork along the fork gantry 107 do not need to be further adjusted. Thus, the processor 1011 controls the automated guided forklift 100 to run at a speed greater than the first speed V1, so as to improve operation efficiency of the automated guided forklift 100. The speed may be 0.3 m/s, 0.35 m/s, 0.4 m/s, 0.45 m/s, etc. On the premise of ensuring safety, another suitable speed may be used.

In other embodiments, when the automated guided forklift 100 moves forward and is in place and the sensor detects that the fork 102 is completely inserted into the fork hole 205 of the carrier, the vertical displacement of the fork 102 is kept to reach a predetermined value. Specifically, When the controller determines that the fork entering operation is completed and the sensor (for example, a mechanical sensor or a visual sensor) detects that the carrier is completely forked by the fork 102, the processor 1011 controls the fork 102 to rise by the vertical displacement $H'_{fork}$ of the predetermined value along the fork gantry 107. For example, the fork rises by 5 cm, 10 cm, 15 cm, 20 cm, etc., so as to provide a safe height. Thus, friction between the fork 102 and the inclined plane of the compartment 206 or the ramp is avoided. In this case, the fork entering operation is completed, and the angle θ of the fork and the displacement of the fork along the fork gantry 107 do not need to be further adjusted. Thus, the processor 1011 controls the automated guided forklift 100 to run at a speed greater than the first speed V1, so as to improve operation efficiency of the automated guided forklift 100. The speed may be 0.3 m/s, 0.35 m/s, 0.4 m/s, 0.45 m/s, etc. On the premise of ensuring safety, another suitable speed may be used.

Step 702

In order to enable the height $H_{fork}$ of the prongs of the fork 102 and the height $H_{pallet}$ of the carrier detected by the sensor to be identical and satisfy a requirement that the included angle between the fork 102 and the carrier is limited within the first angle threshold range, the disclosure mainly uses the processor 1011 to adjust the rotation angle θ of the fork 102 and the vertical displacement $H'_{fork}$ of the fork 102 along the fork gantry 107 in step 304.

In some embodiments, the method includes the following steps:

first time for adjusting the angle of the fork 102 is estimated according to a difference between the angle of the fork 102 and a negative value of the angle of the body, and a predetermined adjustment step size of the angle of the fork 102;

second time for adjusting the vertical displacement of the fork 102 is estimated according to a difference between the vertical displacement of the fork 102 and the height of the fork hole 205, and a predetermined adjustment step size of the vertical displacement of the fork 102; and controlling, if the sum of the first time and the second time is greater than third time, a speed of the automated guided forklift 100 to 0.

Specifically, the processor 1011 estimates the first time t1 for adjusting the angle θ of the fork 102 according to the difference (that is, a target angle $\theta_{target}$ of the fork 102) between the angle θ of the fork 102 and the negative value of the body angle β, and the predetermined adjustment step size of the angle θ of the fork 102. Specifically, the processor 1011 obtains the body angle β of the automated guided forklift 100 and the current rotation angle θ of the fork 102 that are detected by the sensor in real time. A rotational speed w for adjusting the rotation angle θ of the fork 102 is further preset by the processor 1011, and is 0.01 rad/s, 0.02 rad/s, 0.03 rad/s, etc. for example. In this way, the processor 1011 may estimate the first time $t1=(\theta_{target}-\theta_{current})/\omega$, which is required for adjusting the rotation angle θ of the fork 102. $\theta_{target}$ represents an angle by which the fork 102 needs to be adjusted to reach a closest horizontal state. As in the method in step 303, $\theta_{target}$ should first be considered to be adjusted to be the negative value of the body angle β of the automated guided forklift 100. If the angle cannot be achieved (for example, due to a hardware limitation of the fork 102), it is considered that $\theta_{target}$ is a limit value closest to the negative value of the body angle β of the automated guided forklift 100.

In some embodiments, in order to enable the height $H_{fork}$ of the prongs of the fork 102 to be consistent with the height $H_{pallet}$ of the carrier and to limit the included angle between the fork 102 and the carrier within the first angle threshold range, so as to ensure that the fork 102 may fork/withdraw from the carrier smoothly, the processor 1011 estimates the second time t2 for adjusting the vertical displacement $H'_{fork}$ of the fork 102 according to the difference (that is, target vertical displacement $H'_{fork\text{-}target}$ of the fork 102) between the vertical displacement $H'_{fork}$ of the fork 102 and the height $H_{fork}$ of the fork hole 205, and the predetermined adjustment step size of the vertical displacement $H'_{fork}$ of the fork 102. Specifically, the processor 1011 determines the target vertical displacement $H'_{fork\text{-}target}$ by which the fork 102 needs to be adjusted along the fork gantry 107 according to the method in step 304, and meanwhile, the processor 1011 determines current vertical displacement $H'_{fork\text{-}current}$ of the fork 102 according to data fed back by the sensor. The processor 1011 further presets a rate v for adjusting the vertical displacement $H'_{fork}$ of the fork 102, such as 0.02 m/s, 0.04 m/s, 0.06 m/s, etc. In this way, the processor 1011 may estimate the second time $t2=(H'_{fork\text{-}target}-H'_{fork\text{-}current})/v$ required for adjusting the vertical displacement $H'_{fork}$ of the fork 102.

In some embodiments, only one of the rotation angle θ of the fork 102 and the vertical displacement $H'_{fork}$ of the fork 102 along the fork gantry 107 possibly needs to be adjusted. For example, when the processor 1011 determines that the rotation angle θ of the fork 102 is adjusted to the limit value or is equal to the negative value of the body angle β of the automated guided forklift 100, the processor 1011 only computes the second time t2 required for adjusting the vertical displacement $H'_{fork}$ of the fork 102. In other embodiments, the processor 1011 only computes the first time t1 required for adjusting the rotation angle θ of the fork 102.

In some embodiments, the processor 1011 estimates the sum t1+t2 of the first time t1 for adjusting the rotation angle θ of the fork 102 and the second time t2 for adjusting the vertical displacement $H'_{fork}$ of the fork 102 along the fork gantry 107. The automated guided forklift 100 is still traveling, after the time t1+t2, the body height $H_{agv}$ and the body angle β of the automated guided forklift 100 may change. According to the method in step 304, changes in the body height $H_{agv}$ and the body angle β may influence a target rotation angle $\theta_{target}$ of the fork 102 and the target vertical displacement $H'_{fork\text{-}target}$ of the fork 102 along the fork gantry 107. Thus, great errors occur in adjustment of the rotation angle θ of the fork 102 and adjustment of the vertical displacement $H'_{fork}$ of the fork 102 along the fork gantry 107, and accuracy of fork withdrawal and insertion is influenced. The greater t1+t2 value estimated by the processor 1011 indicates a greater adjustment error. Thus, before the processor 1011 adjusts the rotation angle θ of the fork 102 and the vertical displacement $H'_{fork}$ of the fork 102 along the fork gantry 107, different speeds may be considered according to different t1+t2 values, such that an error in adjustment target of the fork 102 caused by vehicle movement may be reduced to an acceptable range.

Step 703

According to step 702, the speed of the automated guided forklift 100 during fork withdrawal and insertion may be controlled. Specifically, the speed is limited, such that displacement of the automated guided forklift 100 is small during the time t1+t2, and further small changes are caused in the body height $H_{agv}$ and the body angle β of the automated guided forklift 100. In this way, it is ensured that the errors in adjustment of the rotation angle θ of the fork 102 and adjustment of the vertical displacement $H'_{fork}$ of the fork 102 along the fork gantry 107 are within an acceptable range. In some embodiments, step 703 is that the processor 1011 determines whether the time t1+t2 is greater than the third time t3. If t1+t2>t3, time for adjusting the rotation angle θ of the fork 102 and the vertical displacement $H'_{fork}$ of the fork 102 along the fork gantry 107 is relatively long. In other words, within the time t1+t2, movement of the automated guided forklift 100 may cause obvious errors in adjustment of the rotation angle θ of the fork 102 and adjustment of the vertical displacement $H'_{fork}$ of the fork 102 along the fork gantry 107. In this case, the processor 1011 controls the automated guided forklift 100 to stop moving (i.e., speed is 0), and then starts to adjust the rotation angle θ of the fork 102 and the vertical displacement $H'_{fork}$ of the fork 102 along the fork gantry 107. The third time t3 may be set to 0.9 s, 1 s, 1.1 s, 1.2 s, etc., and preferably, 1 s.

Step 704

In some embodiments, if the sum of the first time and the second time is less than the third time and greater than fourth time, the speed of the automated guided forklift 100 is set to a second speed V2. The third time is greater than the fourth time. Specifically, step 704 is that the processor 1011 determines whether the time t1+t2 is less than or equal to the third time t3 and greater than the fourth time t4. If t3≥t1+t2>t4, long time is required for adjusting the rotation angle θ of the fork 102 and the vertical displacement $H'_{fork}$ of the fork 102 along the fork gantry 107, movement of the automated guided forklift 100 at the first speed V1 may cause certain errors in adjustment of the rotation angle θ of the fork 102 and adjustment of the vertical displacement $H'_{fork}$ of the fork 102 along the fork gantry 107. In this case, considering efficiency and accuracy, the disclosure finds that movement of the automated guided forklift 100 does not need to be stopped, and only the processor 1011 needs to further control the speed of the automated guided forklift 100 to be reduced to the second speed V2, and then starts to adjust the rotation angle θ of the fork 102 and the vertical displacement $H'_{fork}$ of the fork 102 along the fork gantry 107. The fourth time t4 may be set to 0.4 s, 0.5 s, 0.6 s, etc., and preferably 0.5 S.

Step 705

In some embodiments, if the sum of the first time and the second time is less than the fourth time, the speed of the automated guided forklift 100 is adjusted to be not greater than a first speed V1. The first speed V1 is greater than the second speed V2. Specifically, step 705 is that the processor 1011 determines whether the time t1+t2 is less than or equal to the fourth time t4. If t1+t2≤t4, short time is required for adjusting the rotation angle θ of the fork 102 and the vertical displacement $H'_{fork}$ of the fork 102 along the fork gantry 107, errors in adjustment of the rotation angle θ of the fork 102 and adjustment of the vertical displacement $H'_{fork}$ of the fork 102 along the fork gantry 107 caused by movement of the automated guided forklift 100 at the first speed V1 are within an acceptable range. In this case, movement stopping or further speed reduction of the automated guided forklift 100 is not required, and the processor 1011 controls the automated guided forklift 100 to keep a speed not greater than the first speed V1, and meanwhile, adjusts the rotation angle θ of the fork 102 and the vertical displacement $H'_{fork}$ of the fork 102 along the fork gantry 107.

In some embodiments, if an adjustment amount of the vertical displacement $H'_{fork}$ of the fork 102 has to be greater than a third distance threshold so as to limit the height difference between the prongs and the fork hole 205 within the first distance threshold range, a speed of the automated guided forklift 100 is adjusted to be not greater than a first speed V1. The third distance threshold may be 1.5 cm, 1.8 cm, 2 cm, 2.5 cm, 3 cm, 4 cm, 5 cm, etc., and preferably 2 cm. In steps 703-705, different speeds are set according to the estimated adjustment time of the angle θ of the fork 102 and the estimated adjustment time of the vertical displacement $H'_{fork}$ of the fork 102. Similarly, the third distance threshold of the adjustment amount of the vertical displacement $H'_{fork}$ is set in the embodiment to achieve the following objective: when the adjustment amount of $H'_{fork}$ is great, an adjustment error is reduced through a limitation on the speed of the automated guided forklift 100.

Step 306

In some embodiments, a controller completes the steps 301 to 305. A difference between a height $H_{fork}$ of prongs of a fork 102 and a height $H_{pallet}$ of a fork hole 205 is within an allowable first distance threshold range. The automated guided forklift 100 controls the fork 102 to move forward or backward to complete goods picking and placing. In some other embodiments, the operation in steps 301 to 305 needs to be repeated in step 306, so as to implement withdrawal and insertion of the fork 102. Specifically, a sensor on the automated guided forklift 100 detects a body height $H_{agv}$ of the automated guided forklift, a body angle β of the automated guided forklift, a rotation angle θ of the fork 102 and vertical displacement $H'_{fork}$ of the fork 102 along a fork gantry 107 in real time (for example, every 20 ms). As the automated guided forklift 100 moves, one or more of the parameters may change. In order to ensure that the difference between the height $H_{fork}$ of the prongs of the fork 102 and the height $H_{pallet}$ of the carrier is always within the allowable first distance threshold range, a processor 1011 performs proportional-integral-derivative (PID) control on the rotation angle θ of the fork 102 and/or the vertical displacement $H'_{fork}$ of the fork 102 along the fork gantry 107 according to an algorithm in step 304 until the fork 102 completes fork insertion and withdrawal.

In some embodiments, when the processor 1011 determines that the automated guided forklift 100 travels forward (for example, a rotation encoder built in an axle detects that a wheel rotates forward) and the sensor detects that at least part of the fork 102 is located outside the fork hole 205 of the carrier, the processor 1011 determines that a current process is a state in which the automated guided forklift prepares to fork the goods and the goods are not completely forked in place. Thus, the processor 1011 performs one or more steps of steps 301 to 305. In some embodiments, the processor 1011 may determine that operation of forking goods is currently performed by the automated guided forklift according to an instruction transmitted by an upper computer (for example, a total warehouse scheduling system). In some embodiments, the processor 1011 determines whether the goods are completely forked in place through the sensor (for example, a mechanical sensor or a visual sensor) arranged at a root of the fork 102.

In some embodiments, when the processor 1011 determines that the automated guided forklift 100 travels backward (for example, the rotation encoder built in the axle detects that the wheel rotates reversely) and the sensor detects that at least part of the fork 102 is located inside the fork hole 205 of the carrier, the processor 1011 determines that the current process is a state in which the automated guided forklift uploads the goods to the compartment and the fork 102 does not completely exit the fork hole. Thus, the processor 1011 performs one or more steps of steps 301 to 305. In some embodiments, the processor 1011 may determine that operation of placing goods in the compartment is currently performed by the automated guided forklift according to the instruction transmitted by the upper computer (for example, a total warehouse scheduling system). In some embodiments, the controller determines whether the fork 102 completely withdraws from the fork holes 205 through the sensor (for example, a visual sensor or laser radar).

As used herein, the terms “approximately”, “basically”, “substantially” and “roughly” are used to describe and consider small variations. When used in combination with an event or situation, the terms may indicate an example in which the event or situation precisely occurs and an example in which the event or situation approximately occurs. As used herein, with respect to a specified value or range, the term “roughly” generally means within ±10%, ±5%, ±1%, or ±0.5% of the specified value or range. The range may be expressed as a range from one end point to another end point, or between two end points herein. All ranges disclosed herein include end points unless otherwise specified. The term “basically coplanar” may describe two surfaces that are located along an identical plane and are within a few micrometers (μm), and for example, located along an identical plane and within 10 μm, 5 μm, 1 μm, or 0.5 μm. With reference to “basically” identical values or features, the term may refer to a value that is within ±10%, ±5%, ±1%, or ±0.5% of a mean value of the values. For another example, “roughly horizontal” and “roughly horizontal state” involved in the disclosure mean that an included angle between the described object and a horizontal plane does not exceed a limit threshold, and for example, the included angle ≤2°, ≤1.5°, ≤1°, ≤0.5°, etc. The description that an object is “roughly horizontal” further includes a case where the object is completely horizontal.

As used herein, singular terms “a”, “an” and “the” may include plural indication objects, unless otherwise explicitly indicted in the context. In the description of some embodiments, a component provided “on” or “above” another component may cover a case where the former component is directly on the latter component (for example, in physical contact with the latter component), and a case where one or more intermediate components are located between the former component and the latter component.

What are described above summarize features of several embodiments and detailed aspects of the disclosure. The embodiments described in the disclosure can be easily used as a basis for designing or modifying other processes and a structure for executing identical or similar objectives and/or obtaining identical or similar advantages of the embodiments introduced in the disclosure. The equivalent structures do not depart from the spirit and scope of the disclosure, and different variations, replacements, and changes may be made without departing from the spirit and scope of the disclosure.

We claim:

1. An automated guided forklift, comprising a processor, wherein in a process of picking and placing a carrier by the automated guided forklift, a body of the automated guided forklift is in an inclined state, the carrier is in a roughly horizontal state, and the processor is configured to execute a program instruction so as to implement the following steps:

determining an angle and a height of the body of the automated guided forklift;

determining a height of a fork hole of the carrier; and adjusting an angle and vertical displacement of a fork of the automated guided forklift according to the height of the fork hole and the angle and the height of the body, so as to limit an included angle between the fork and the carrier within a first angle threshold range, and to limit a height difference between prongs of the fork and the fork hole within a first distance threshold range.

2. The automated guided forklift according to claim 1, wherein the steps further comprise:

determining, before executing the determining an angle and a height of the body of the automated guided forklift, whether a distance difference between the prongs and the fork hole is within a second distance threshold range, and executing the step only when the distance difference between the prongs and the fork hole is within the second distance threshold range.

3. The automated guided forklift according to claim 1, wherein the determining an angle of the body of the automated guided forklift further comprises:

determining the angle of the body through a gyroscope; or determining the angle of the body through three dimensional (3D) laser radar.

4. The automated guided forklift according to claim 1, wherein the determining a height of the body of the automated guided forklift further comprises:

determining the height of the body through 3D laser radar; or determining the height of the body through two dimensional (2D) laser radar and the angle of the body.

5. The automated guided forklift according to claim 1, wherein the determining a height of a fork hole of the carrier further comprises:

determining, when a pressure sensor detects that pressure carried by the fork is 0, the height of the fork hole through the sensor.

6. The automated guided forklift according to claim 1, wherein the adjusting an angle of a fork of the automated guided forklift further comprises:

adjusting the angle of the fork to be equal to a negative value of the angle of the body; or adjusting the angle of the fork to a limit value in a direction close to a negative value of the angle of the body.

7. The automated guided forklift according to claim 1, wherein a height of the prongs is equal to the sum of the height of the body, the vertical displacement of the fork, a height change value caused by the angle of the body, and a height change value caused by the angle of the fork.

8. The automated guided forklift according to claim 7, wherein the height change value caused by the angle of the body is determined according to a distance between the prongs and the body and the angle of the body.

9. The automated guided forklift according to claim 7, wherein the height change value caused by the angle of the fork is determined according to a length of the fork and the angle of the fork.

10. The automated guided forklift according to claim 1, wherein the steps further comprise:

adjusting, when a sensor detects that a distance difference between the prongs and the fork hole is within a second distance threshold range, a speed of the automated guided forklift to be not greater than a first speed.

11. The automated guided forklift according to claim 1, wherein the steps further comprise:

keeping, when the automated guided forklift moves backward and a sensor detects that a distance difference between the prongs and the fork hole is not within a second distance threshold range, the vertical displacement of the fork to reach a predetermined value.

12. The automated guided forklift according to claim 1, wherein the steps further comprise:

keeping, when the automated guided forklift moves forward and is in place and a sensor detects that the fork is completely inserted into the fork hole of the carrier, the vertical displacement of the fork to reach a predetermined value.

13. The automated guided forklift according to claim 1, wherein the steps further comprise:

estimating first time for adjusting the angle of the fork according to a difference between the angle of the fork and a negative value of the angle of the body, and a predetermined adjustment step size of the angle of the fork;

estimating second time for adjusting the vertical displacement of the fork according to a difference between the vertical displacement of the fork and the height of the fork hole, and a predetermined adjustment step size of the vertical displacement of the fork; and controlling, if the sum of the first time and the second time is greater than third time, a speed of the automated guided forklift to 0.

14. The automated guided forklift according to claim 13, wherein the steps further comprise:

setting, if the sum of the first time and the second time is less than the third time and greater than fourth time, the speed of the automated guided forklift to be a second speed, the third time being greater than the fourth time.

15. The automated guided forklift according to claim 14, wherein the steps further comprise:

adjusting, if the sum of the first time and the second time is less than the fourth time, the speed of the automated guided forklift to be not greater than a first speed, the first speed being greater than the second speed.

16. The automated guided forklift according to claim 1, wherein the steps further comprise:

adjusting, if the angle of the body is within the first angle threshold range or the angle of the fork reaches a limit value, only the vertical displacement of the fork without adjusting the angle of the fork, so as to limit the height difference between the prongs and the fork hole within the first distance threshold range.

17. The automated guided forklift according to claim 1, wherein the steps further comprise:

adjusting, if a difference between the angle of the fork and a negative value of the angle of the body is not within the first angle threshold range and the angle of the fork does not reach a limit value, the vertical displacement of the fork and the angle of the fork, so as to limit the height difference between the prongs and the fork hole within the first distance threshold range.

18. The automated guided forklift according to claim 1, wherein the steps further comprise:

adjusting, if an adjustment amount of the vertical displacement of the fork has to be greater than a third distance threshold so as to limit the height difference between the prongs and the fork hole within the first distance threshold range, a speed of the automated guided forklift to be not greater than a first speed.

19. A control method for an automated guided forklift, wherein in a process of picking and placing a carrier by the automated guided forklift, a body of the automated guided forklift is in an inclined state, the carrier is in a roughly horizontal state, and the method comprises the following steps:

determining an angle and a height of the body of the automated guided forklift;

determining a height of a fork hole of the carrier; and adjusting an angle and vertical displacement of a fork of the automated guided forklift according to the height of the fork hole and the angle and the height of the body, so as to limit an included angle between the fork and the carrier within a first angle threshold range, and to limit a height difference between prongs of the fork and the fork hole within a first distance threshold range.

20. A controller, used to execute a program instruction so as to control an automated guided forklift to implement the following steps:

determining an angle and a height of a body of the automated guided forklift;

determining a height of a fork hole of a carrier, in a process of picking and placing the carrier by the automated guided forklift, the body of the automated guided forklift being in an inclined state, and the carrier being in a roughly horizontal state; and adjusting an angle and vertical displacement of a fork of the automated guided forklift according to the height of the fork hole and the angle and the height of the body, so as to limit an included angle between the fork and the carrier within a first angle threshold range, and to limit a height difference between prongs of the fork and the fork hole within a first distance threshold range.

* * * * *